United States Patent
Beardsley et al.

(10) Patent No.: US 8,107,721 B2
(45) Date of Patent: Jan. 31, 2012

(54) METHOD AND SYSTEM FOR DETERMINING POSES OF SEMI-SPECULAR OBJECTS

(75) Inventors: Paul A. Beardsley, Boston, MA (US); Moritz Baecher, Gottlieben (CH)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 916 days.

(21) Appl. No.: 12/129,386

(22) Filed: May 29, 2008

(65) Prior Publication Data

US 2009/0297020 A1 Dec. 3, 2009

(51) Int. Cl.
*G06K 9/00* (2006.01)
(52) U.S. Cl. .................... 382/154; 382/100
(58) Field of Classification Search .............. 382/154
See application file for complete search history.

(56) References Cited

U.S. PATENT DOCUMENTS

| | | | |
|---|---|---|---|
| 7,295,720 B2 | 11/2007 | Raskar | |
| 2003/0038822 A1* | 2/2003 | Raskar | 345/632 |
| 2008/0260238 A1 | 10/2008 | Pfister et al. | |
| 2009/0080036 A1* | 3/2009 | Paterson et al. | 358/474 |

OTHER PUBLICATIONS

Huber et al. "Using a Hybrid of Silhouette and Range Templates for Real—time Pose Estimation" IEEE Proceedings of Int. Conf. on Robotics and Automation, Apr. 2004, pp. 1652-1657.*
Scharstein et al., "High-Accuracy Stereo Depth Maps Uing Structured Light," Proc. Conference Determiner Vision and Pattern Recognition, 2003.
Raskar et al., "Non-photorealistic camera: Depth Edge Detection and Stylized Rendering Using Multi—Flash Imaging," ACM Siggraph, 2004.
Germann et al, Automatic Pose Estimation for Range Images on the GPU, Sixth Intl Conf on Digital Imaging and Modeling, 2007.

* cited by examiner

*Primary Examiner* — Brian Werner
*Assistant Examiner* — Utpal Shah
(74) *Attorney, Agent, or Firm* — Dirk Brinkman; Gene Vinokur

(57) ABSTRACT

A camera acquires a set of coded images and a set of flash images of a semi-specular object. The coded images are acquired while scanning the object with a laser beam pattern, and the flash images are acquired while illuminating the object with a set of light sources at different locations near the camera, there being one flash image for each light source. 3D coordinates of points on the surface of the object are determined from the set of coded images, and 2D silhouettes of the object are determined from shadows cast in the set of flash images. Surface normals are obtained for the 3D points from photometric stereo on the set of flash images. The 3D coordinates, 2D silhouettes and surface normals are compared with a known 3D model of the object to determine the pose of the object.

10 Claims, 3 Drawing Sheets

METHOD AND SYSTEM FOR DETERMINING POSES OF SEMI-SPECULAR OBJECTS

FIELD OF THE INVENTION

The invention relates generally to computer vision, and more particularly to determining poses of semi-specular objects.

BACKGROUND OF THE INVENTION

Sensors that acquire 3D data are useful for many applications. For example, a system for automated 'bin-picking' in a factory can acquire 3D data of a bin containing multiple instances of the same object, and compare the 3D data with a known 3D model of the object, in order to determine the poses of objects in the bin. Then, a robot arm can be directed to retrieve a selected one of the objects. The pose of an object is its 3D location and 3D orientation at the location. One set of vision-based techniques for sensing 3D data assumes that the objects have non-specular surfaces, such as matte surfaces.

Another type of sensor determines the silhouette of the object, and compares the silhouette with the known 3D model of the object, in order to determine pose. One set of techniques for determining the silhouette assumes that, the objects cast shadows when illuminated.

Non-Specular Surfaces

Vision-based techniques for sensing 3D data for non-specular surfaces include structured light, time-of-flight laser scanners, stereo cameras, moving cameras, photometric stereo, shape-from-shading, and depth-from-(de)focus.

All of these techniques assume either that incident: light on the surface is reflected diffusely, and hence, reflected light is visible at: any sensor with a line-of-sight to the surface or they assume that visible features are actually physical features on the object surface with a measurable 3D physical location, and are not reflected features. These techniques degrade as the surface becomes less diffuse and more specular, because the above assumptions are no longer true.

Specular Surfaces

Vision-based techniques for sensing the 3D pose and shape of specular surfaces assume that there are features in a surrounding scene that are reflected by the specular surface. The features may be sparse, such as specular highlights arising: from point light sources in the scene. If the features are sparse, then the sensed 3D shape of the surface is also sparse. This is undesirable for many applications. For example, it is difficult to determine a reliable pose of an object when the sensed features are sparse. The problem can be ameliorated by moving the camera or the identifying features relative to the surface, but this increases the complexity of the system and is time-consuming.

Semi-Specular Surfaces

There are few vision-based sensors known in the art for objects with semi-specular surfaces, such as bin shed metal where the surface reflects some of the incident light in a specular way, and some of the light in a diffuse way. This is because techniques that sense 3D data by using diffuse reflection, receive less signal from a semi-specular surface, so they are less reliable. The techniques that determine the object silhouette using cast-shadows are also less reliable because the shadow is less pronounced when it is cast on semi-specular background, as occurs with a bin of semi-specular objects for example. Techniques that work on specular objects are inapplicable because sharp reflected features are not visible.

Thus, there is a need for a method and system for determining poses of semi-specular objects that performs well on varied surface shapes such as planar and curved semi-specular surfaces.

SUMMARY OF THE INVENTION

The embodiments of the invention provide a method for determining a pose of a semi-specular object using a hybrid sensor including a laser scanner and a multi-flash camera (camera). The scanner and camera have complementary capabilities.

The laser scanning acquires high-quality 3D coordinate data of fronto-parallel parts of the surface of an object:, with quality decreasing as the surface becomes more oblique with respect to the scanner; the laser scanning cannot: acquire any data at the occluding contour of the object.

In contrast, the camera can acquire 2D flash images that show cast-shadows of the object, which can be used to determine the silhouette, but it does not acquire data elsewhere on the object surface.

Both of these methods work best on diffuse surfaces. Both degrade as the object becomes more specular. In the case of the laser scanner, the reflected laser pattern becomes weaker and less detectable as the object becomes more specular, with failure on the most oblique parts of the surface first, and then covering more and more of the surface. In the case of the camera, the ability to identify cast-shadows in the flash images decreases as the background objects on which the shadows are being cast become more specular, Thus, both the scanner and the camera produce lower-quality information on semi-specular objects than on diffuse-surface objects. However, the method combines the 3D data and the 2D silhouette information, so that even though the information are poor quality when taken individually, it is still possible to obtain an accurate pose of a semi-specular object when taking them together, More particularly, a camera acquires a set of coded images and a set of flash images of an object. The coded images are acquired while scanning the object with a laser beam pattern, and the flash images are acquired while illuminating the object with a set of light sources at different locations near the camera, there being one flash image for each fight source, 3D coordinates of points on the surface of the object are determined from the set of coded images, and 2D silhouettes of the object are determined from shadows cast in the set of flash images Surface normals are obtained using photometric stereo with the flash images. The 3D coordinates, 2D silhouettes and surface normals are used to determine the pose of the object.

DETAILED DESCRIPTION OF THE PREFERRED EMBODIMENTS

Figure 1:
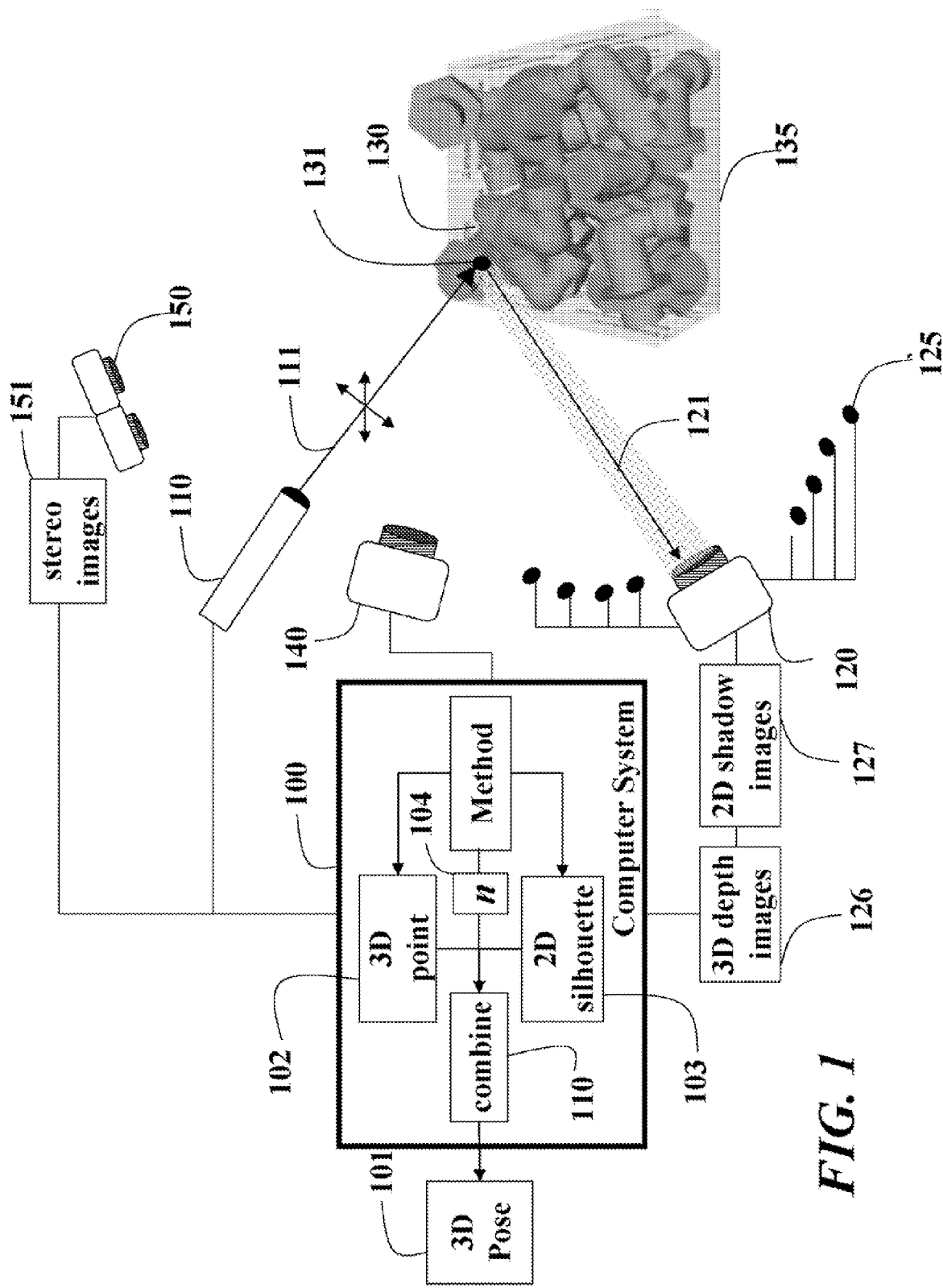
FIG. 1 is a block diagram of a system and method for determining a 3D pose of an object that includes specular surfaces according to an embodiment of our invention.

FIG. 1 shows a system and method 100 for determining a 3D pose 101 of an object 130 that includes semi-specular surfaces according to an embodiment of our invention. The 3D pose as defined herein means the 3D location and the 3D orientation of the object.

The system includes a hybrid sensor including a laser scanner 110 and a camera 120. The laser scanner 110 emits a laser beam 111 in a pattern 112 that can be used to determine 3D range data in a set of coded images 326 acquired by the camera 120. The pattern can use Gray-codes so that the pattern at each point on the surface of the object is unique. Thus, the method determines 3D coordinate data at each point on the surface from the set of coded images 126.

The camera also 120 acquires light 121 reflected by the object. The camera includes multiple flash units 125, e.g., LEDs, arranged at different locations, e.g., in an octagon or circular pattern, around the camera. The LEDs are bright point light sources that cast sharp shadows. The camera also acquires a set of flash images of the object. The flash images are used to determine the 2D silhouette of the object.

The set of coded images 126 is used to determine the 3D coordinates of the points 102 identified by laser scanning as well the 2D silhouette 103. The significance is that the 3D points and the 2D silhouettes are measured from a single camera 120 so they are in the same coordinate frame. This makes it possible to project the 3D points to the 2D camera image plane. Alternatively, it is also possible to 'back-project' any point on a 2D silhouette to a 3D ray in 3D space, where it is in the same coordinate frame as the 3D point coordinates obtained by the laser scanning.

The laser scanning projects the laser beam pattern onto the surface of the object to acquire ranges or 'depths' to points 301 on the object's surface. The laser scanning data are sometimes called a range or depth map. The range map can be converted to the coordinates 102 of 3D points 301 on the surface of the object.

The camera also acquires a diffuse component of light reflected by the surface of the object by acquiring the set of flash images 127, one for each point light source 125. The light sources cast shadows at occluding contours, which reveal the silhouette of the object. By combining 110 the 3D scanner coordinate points 102 and the 2D silhouettes 103 the pose 101 of the object can be determined.

The laser scanning is less effective if the surface is specular because the reflected laser light shifts from the diffuse component to a specular component. This makes it more difficult to detect the diffuse component at the camera. Thus, laser scanning is only effective for the parts of the surface that are most fronto-parallel to the sensor. It is difficult to extract data for oblique parts of the surface. On a curved object, only a small amount of surface data can be determined.

The object is also illuminated by the point light sources (flash units) 125 arranged near the camera. For each light source, the corresponding image 127 includes the shadows cast by the object onto a nearby background surface. The cast shadows are used to infer the 2D occluding and self-occluding silhouettes as observed from the viewpoint of the camera. The occluding contour is obtained most reliably when the shadows are being cast on a diffuse surface, which is the case for an isolated object of any material on a diffuse background and not for external distribution, or for stacked diffuse objects.

Our goal is to determine the 3D pose for each of an arbitrarily stacked pile of semi-specular objects in a bin 135. It is assumed that objects are identical and all have the same known shape. For a particular object shape, and a full spectrum of possible materials with Lambertian to mirror-surface, there will be some failures as the object material becomes more specular, beyond which the camera cannot extract sufficient data to determine the pose.

The idea behind the invention is that the coded images 126 produces high quality 3D coordinate information at semi-specular surfaces front-to-parallel to the scanner but no information at the occluding contours, while the flash images 127 produces shape information only at occluding contours. Thus, the scanner and the camera are complementary and mutually supporting.

The coded images produce the 3D coordinates 102 of the points 131, while the flash image produces the silhouette data 103. Therefore, the acquired 2D and 3D data are heterogeneous, Our hybrid sensor is an unusual combination, and to the best of our knowledge such a system is not described in the prior art. The laser scanning uses structured light based on Gray-codes as described by Scharstein et al., "High-accuracy stereo depth maps using structured light," Proc, Conference Determiner Vision and Pattern Recognition, 2003. The camera is described by Raskar et al., "Non-photorealistic camera: Depth edge detection and stylized rendering using multi-flash imaging," ACM Siggraph, 2004 and U.S. Pat. No. 7,295,720. The method of pose computation is based on range map matching described by Germann et al, "Automatic pose estimation for range images on the GPU, Sixth Intl Conf on Digital Imaging and Modeling, 2007, and in U.S. patent application Ser. No. 11/738,642, "Method and System for Determining Objects Poses from Range Images" filed by Pfister et al. on Apr. 23, 2007, all incorporated herein by reference. The prior art methods are adapted to our unusual hybrid sensor.

Hybrid Sensor Calibration

Calibration is a one-time preprocessing step. Calibration of the sensors can use a second, temporary camera 140. This is not essential but simplifies the processing of the data. The calibration determines the intrinsic and extrinsic stereo parameters of the laser scanner 110 and the camera 120.

To determine the intrinsic parameters of the laser scanner, we project a Gray-code pattern 112 onto a blank (white) surface, and determine the 3D coordinates 102 of the pattern using stereo images 151 acquired by a stereo camera 150. We store the 2D coordinates of the pattern on the laser scanning image plane, along with, the corresponding 3D coordinates determined in the previous step. We repeat the above for two or more positions of the plane. This information can use conventional plane-based camera calibration.

Then, we determine the extrinsic parameters between the camera and the laser scanner. We project the pattern on the blank surface and store corresponding points in the camera image and on the laser scanning image plane. We repeat the above for two or more positions of the plane and determine a fundamental matrix F between the camera and scanner. In computer vision, the fundamental matrix F is a 3×3 matrix, which relates corresponding points in stereo images. We decompose the matrix F to determine the extrinsics between the camera and scanner making use of intrinsic parameters of the camera and laser scanner.

We determine the 3D positions of the LEDs 125 by placing a planar mirror, augmented with calibration marks near the camera. We determine the 3D coordinates of the mirror plane $\pi$ using the calibration marks and the stereo camera. We determine the 3D coordinates of the virtual (reflected) LEDs. We reflect the virtual LED coordinates in the mirror plane $\pi$ to obtain the 3D coordinates of the LEDs with respect to the camera.

The above steps provide a complete calibration of all intrinsics and extrinsics parameters for all optical components. This calibration information is used to determine 3D surface points using Gray-codes, Photometric Stereo Our hybrid sensor combines 110 the data acquired from the laser scanning 110 and flash images 103. The data are used to determine coordinates 102 of the 3D points on the object 130, and to determine the silhouettes 103 of the occluding contours 300 of objects in the bin, see FIG. 3 for an example object with complex contours. It also enables us to determine surface normals n 104 at the 3D points using photometric stereo. The normals 104 indicate the orientation of the object.

Our method differs from conventional photometric stereo in that there is no need for an assumption that the light sources 125 are distant from the object 130, which is an issue in practical applications, such bin picking.

Surface Normals

Figure 2:
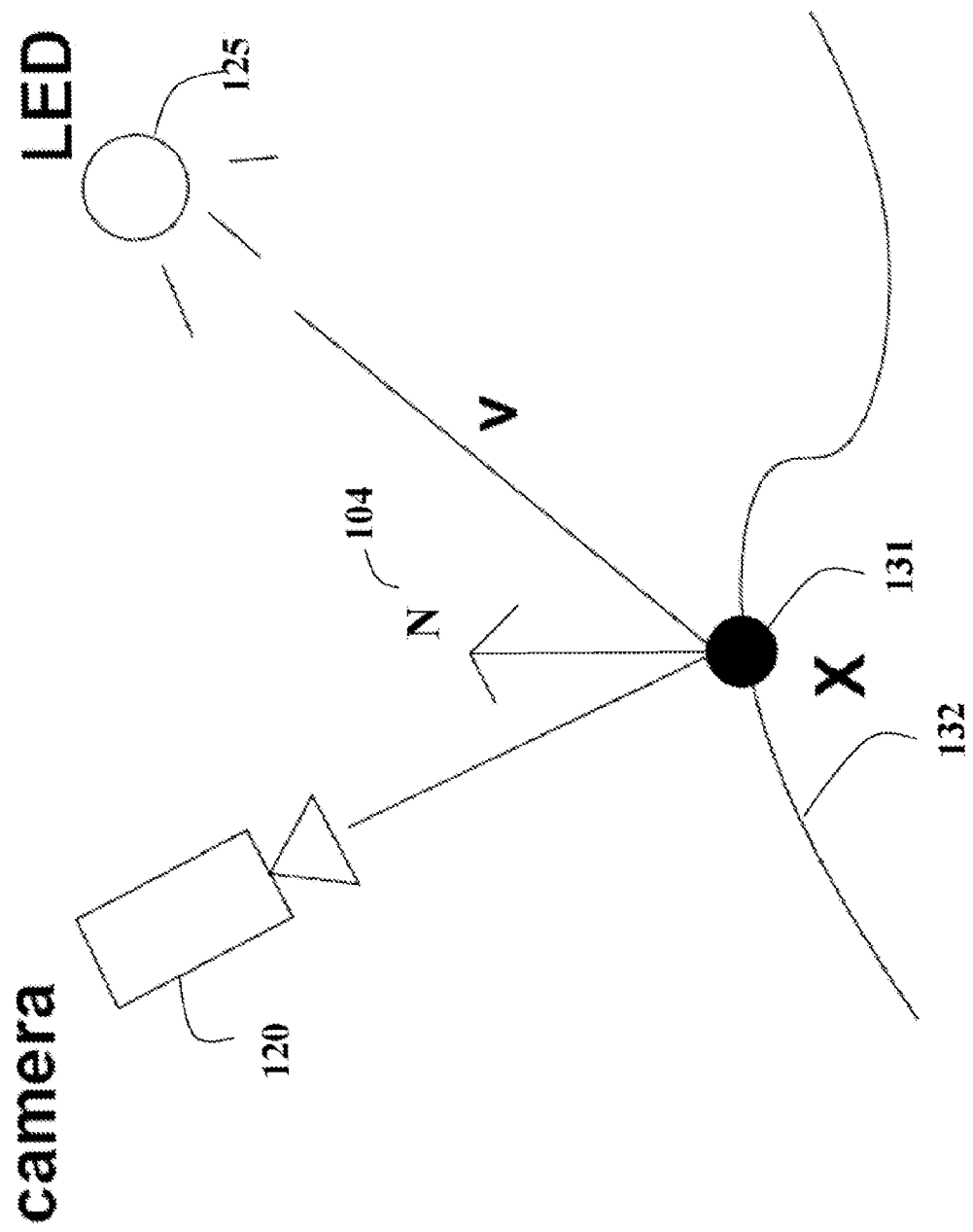
FIG. 2 is a schematic of a camera and a light source relative to a surface according to an embodiment of our invention.

As shown in FIG. 2, the camera 120 observes a 3D point X 131 on the surface 132 of the object 130, with coordinates 102 known from the laser scanning, and records intensity $I_0$. The first LED 125 is illuminated, and the camera records intensity $I_1$. This puts a constraint on the surface normal $$I_1 - I_0 = kv_1 n, \quad (1)$$

where k is an unknown constant depending on the brightness of the LED, and the surface albedo at the point X. Brightness is assumed to be constant for all the LEDS, and hence k is also constant. Each LED can be used to generate one equation, and three or more equations provide a linear solution for the orientation of the normal n, up to unknown scale, which can be normalised to obtain a unit vector. This scheme fails if the surface is specular at the point X 131. Therefore, we use a threshold check on $I_i - I_0$ to eliminate specularities.

Figure 3:
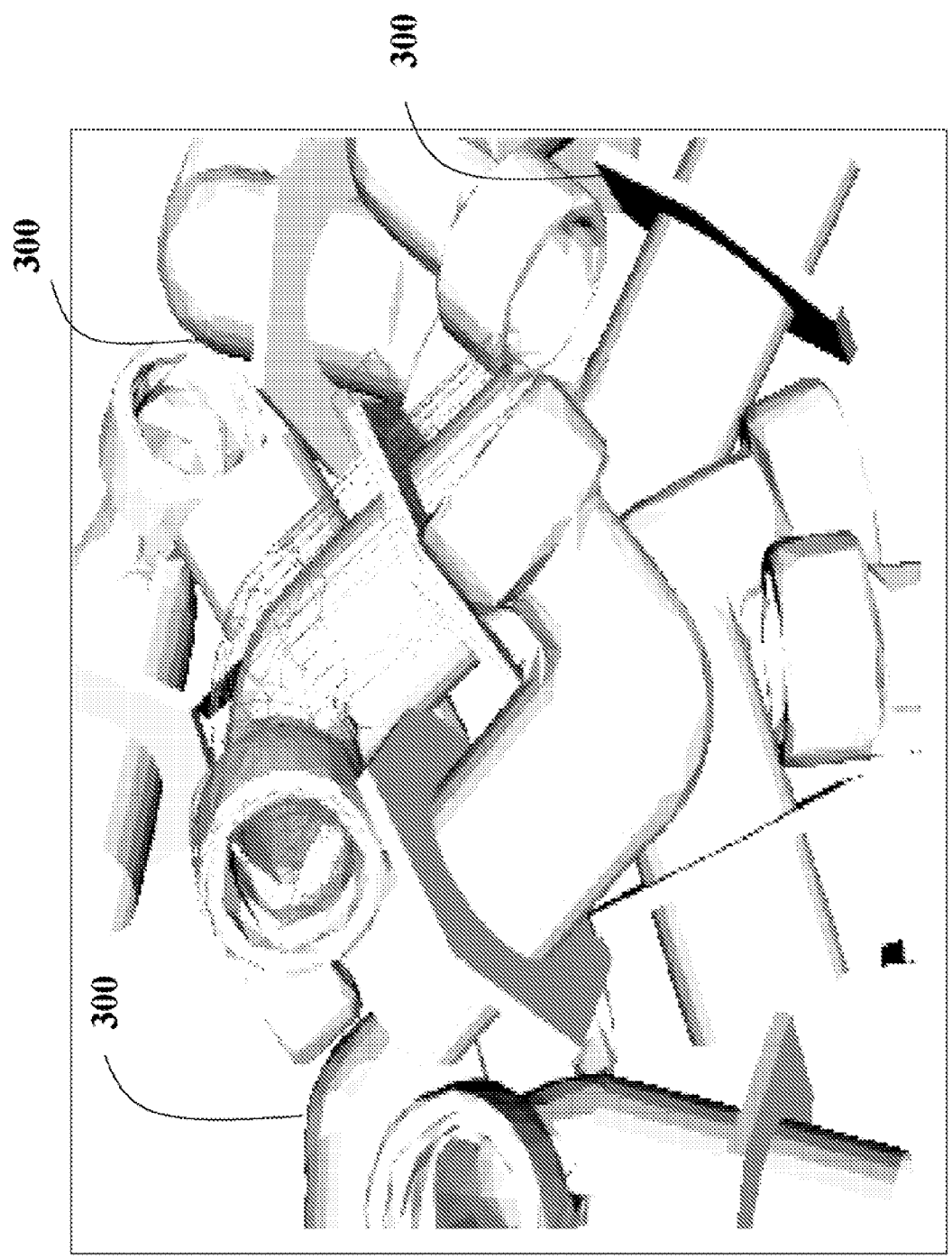
FIG. 3 is an image of occluded contours of an object surfaces according to an embodiment of our invention.

The laser scanning produces the coordinates 102 of the 3D points from which surface normals n can be inferred. However, photometric stereo produces a per-pixel measurement at the camera, whereas 3D points require local surface fitting to generate a normal, which is a non-trivial process. A more significant benefit of doing photometric stereo, in addition to laser scanning, is described below, Pose Determination Our hybrid sensor generates heterogeneous data, i.e., coordinates of 3D points 102 from the laser scanning, and silhouettes 103 in the 2Ds images 127 of the occluding contours 300 from the camera. FIG. 3 shows example occluding contours 300 for a complex object. The pose determination can be done in 3D or 2D. For computational, efficiency, we perform all operations on in 2D on the image plane. Because the data may be incomplete, our method assumes that the occluding contours can also be incomplete.

The input for the method by Germann is a 3D range map, and the pose determination, is a minimization over the six DOF of pose of a 3D distance error, to bring the object model into close correspondence with the range data. However, we modify the distance error of Germann significantly to work on our 2D image plane, and to include an error associated with the occluding contours. Note, Germann only considers 3D range data and not 2D images.

Pose Cost Function

We determine the 3D pose of the object that is consistent with the sensed data and a 3D model of the object. The 3D model of the object can be obtained by computer-aided design (CAD). The 3D model of the object is matched to the 2D images 127, and consistency is measured in 2D on the image plane which has both the 3D laser data and the 2D contour data.

The issue of initializing the pose is described below. For a current pose estimate, the object model is projected onto the image plane. The projected information defines a silhouette and also provides depth and surface normal information for pixels inside the contour of the object.

Our cost function has two components: a position error $D_1$ for the projected model and the laser scanning 3D coordinate data 102; and a shape error $D_2$ for the projected model and the occluding 2D contours.

The Position Error $D_1$

The set of pixels corresponding to the projected model of the object is P. For a particular pose, the depth and surface normal of the object: model are known at every pixel in the set P. The set of pixels where the laser scanning has acquired coordinate data is L. The depth of the object is known at each pixel in the set L. The surface normal of the target object is typically known at each pixel in the set L, but may be absent if the photometric stereo failed.

The position error $D_1$ is measured over the pixels in the intersection of the sets P and L. The error at each pixel is $$e_1 = (r_1 - r_2) \cdot \lambda, \quad (2)$$

where $r_i$ is the depth and $\lambda$ is unity if the scanning process failed to determine surface normal at the pixel, else $$\lambda = 1.0 / \max(\cos 45, n_1, n_2), \quad (3)$$

where $n_1$ and $n_2$ are the surface normals of the object model and the object at the pixel.

The Shape Error $D_2$

The shape error $D_2$ measures a consistency between the boundary of the projected model and the occluding contours as imaged by the camera. The shape error $D_2$ is a 3D error, so that it can be meaningfully summed with the position error $D_1$.

The pixels b on a surface or boundary of the projected 3D model is a set B. The pixels m where the camera has detected an occluding contour is a set M. Each pixel m in the set M is paired with a closest pixel b in the set M. The set of pairs (b, m) is culled in two ways When there are multiple pairs with the same pixel m, we delete all pairs except the pair with a minimal distance between pixels b and m. For each pixel b and m, we indicate whether the pixel is inside or outside the object.

We also delete all pairs that contain pixels both inside and outside the object. The shape error $D_2$ is summed over the resulting set of pairs (m, b). The error at each pair is $$e_2 = d \cdot \tan \theta, \quad (4)$$

where d is the distance to the object model at pixel b, and θ is the angle between the two camera rays through pixels m and b. For computational efficiency, the pixel-specific depth d can be replaced by a global value $d_0$ that is the average distance to the 3D points 131.

Error Minimization

We minimize a combined error $D = D_1 + D_2$ over the six degrees-of-freedom of the pose of the object. The pose estimate is initialized with multiple start-points around the viewsphere. The computation of the pairs (m, b) is potentially time-consuming. Therefore, we determine a distance map for the camera occluding contours before the minimization begins. Subsequently, each pixel b in the set B can use the distance map to identify its nearest pixel m the set M.

Inter-Reflection

A problem in using a laser scanner on a specular object is caused by inter-reflection, whether between the object and the background, or between objects. For an inter-reflection, the detected signal is still a valid Gray-code, but the path of the light was not directly from the laser to the surface and back, so triangulation of the range data generates a spurious 3D point.

To deal, with this, we determine the consistency between the 3D coordinates of the points determined by the laser scanning and the surface normals determined by photometric stereo.

The two methods will be inconsistent in an area where there is an inter-reflection. Both methods may detect a signal for the inter-reflection, but their respective 3D computations are based on different light sources, i.e., the laser and the LEDs, so the spurious 3D points and spurious photometric surface normals generated for inter-reflection are not consistent. Inconsistent areas are eliminated from the pose determination.

Effect of the Invention

A hybrid sensor system and method determines a pose of a semi-specular object. The method combines data from a laser scanning and from a multi-flash images. The method deals with dealing with inter-reflections when scanning specular objects.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a pose of an object, comprising:
   acquiring a set of coded images of an object by a camera while scanning the object with a laser beam pattern, in which the object is semi-specular;
   acquiring a set of flash images of the object by the camera while illuminating the object with a set of light sources at different locations near the camera, there being one flash image for each light source;
   determining 3D coordinates of points on the surface of the object from the set of coded images;
   determining 2D silhouettes of the object from shadows cast in the set of flash images;
   determining surface normals of the points on the surface of the object using the 3D coordinates and photometric stereo of the 2D silhouettes; and
   combining the 3D coordinates, the 2D silhouettes, and the surface normals to determine a pose of the semi-specular object, wherein the combining further comprises:
   determining a position error by comparing the 3D coordinates with a 3D model of the object in a particular pose;
   determining a silhouette error by comparing the 2D silhouette of the object with a projected silhouette of the 3D model in the particular pose; and
   finding the pose of the 3D model that minimizes a sum of the position error and the silhouette error.

2. The method of claim 1, in which the laser beam pattern uses Gray-codes.

3. The method of claim 1, in which a set of pixels corresponding to the 3D coordinates is L, and a depth at each pixel in the set L is known, and a set of pixels corresponding to the projection of the known 3D model of the object is P, and a depth at each pixel in the set P is known, and in which the position error at each pixel is $$e_1=(r_1-r_2)\cdot\lambda,$$

where $r_i$ corresponds to the depths, and $$\lambda=1.0/\max(\cos 45, n_1, n_2),$$

where $n_1$ and $n_2$ are respective surface normals from the known 3D model, and from either the 3D coordinates or the flash images.

4. The method of claim 1, in which the silhouette error measures a consistency between the sensed silhouette and a boundary of the projection of the known 3D model.

5. The method of claim 1, in which a surface normal obtained from the 3D coordinates is compared with the surface normal obtained from the flash images, and areas where the two surface normals are inconsistent are marked as being laser inter-reflections.

6. The method of claim 1, in which inter-reflections are ignored.

7. The method of claim 1, in which the object is located in a bin with a plurality of identical objects; and further comprising:
   selecting the object according to the pose.

8. The method of claim 1, in which the set of coded images form a depth map.

9. The method of claim 1, in which the silhouettes include occluding and self-occluding silhouettes.

10. An apparatus for determining a pose of an object, comprising:
    a camera configured to acquire a set of coded images of an object while scanning the object with a laser beam pattern, in which the object is semi-specular, and a set of flash images of the object while illuminating the object with a set of light sources at different locations near the camera, there being one flash image for each light source;
    means for determining 3D coordinates of points on the surface of the object from the set of coded images;
    means for determining 2D silhouettes of the object from shadows cast in the set of flash images;
    means for determining surface normals of file points on the surface of the object using the 3D coordinates and photometric stereo of the 2D silhouettes; and
    means for combining the 3D coordinates, the 2D silhouettes, and the surface normals to determine a pose of the semi-specular object, wherein a position error is determined by comparing the 3D coordinates with a 3D model of the object in a particular pose, a silhouette error is determined by comparing the 2D silhouette of the object with a projected silhouette of the 3D model in the particular pose, and the pose of the 3D minimizes a sum of the position error and the silhouette error.

* * * * *